United States Patent
Miyake et al.

(10) Patent No.: US 6,881,918 B2
(45) Date of Patent: Apr. 19, 2005

(54) ELECTRIC DISCHARGE MACHINING APPARATUS

(75) Inventors: Hidetaka Miyake, Tokyo (JP); Yoshihito Imai, Tokyo (JP); Takayuki Nakagawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 46 days.

(21) Appl. No.: 10/706,962

(22) Filed: Nov. 14, 2003

(65) Prior Publication Data

US 2005/0016965 A1    Jan. 27, 2005

(30) Foreign Application Priority Data

Jul. 24, 2003 (JP) .............................. 2003-279258

(51) Int. Cl.[7] .............................. B23H 1/00; B23H 7/30
(52) U.S. Cl. .................................................. 219/69.2
(58) Field of Search ............ 219/69.2, 69.11; 310/90.5

(56) References Cited

U.S. PATENT DOCUMENTS

| | | | | |
|---|---|---|---|---|
| 2,385,665 A | * | 9/1945 | Warwick ................... | 219/69.2 |
| 6,788,019 B1 | * | 9/2004 | Imai et al. .................. | 318/570 |
| 2003/0019844 A1 | * | 1/2003 | Shih .......................... | 219/69.2 |
| 2003/0080094 A1 | | 5/2003 | Imai et al. | |

FOREIGN PATENT DOCUMENTS

| | | |
|---|---|---|
| JP | 1-234162 A | 9/1989 |
| JP | 2000-218442 A * | 8/2000 |
| WO | WO-02/024389 A1 * | 3/2002 |

OTHER PUBLICATIONS

"Magnetic Levitation and Magnetic Bearing," *Electric Institute, Magnetic Levitation Application Technology Research Expert Committee Edition*.

* cited by examiner

*Primary Examiner*—Geoffrey S. Evans
(74) *Attorney, Agent, or Firm*—Leydig, Voit & Mayer, Ltd.

(57) ABSTRACT

An electric discharge machining apparatus has improved responsive drivability and improved machining speed. A tool electrode has a tip end directed toward a work piece, a voltage applied between the tool electrode and the work piece generating a discharge. A drive shaft is connected with the tool electrode. An electrode driving device has magnetic bearings for moving the drive shaft in three directions, including a Z-axis direction, which is an axial direction of the drive shaft, a Y-axis direction perpendicularly crossing the Z-axis direction, and an X-axis direction perpendicularly crossing the Y-axis direction and Z-axis direction, by supplying electric current to electromagnetic portions to control magnetic attraction. A movable coupling is connected with an end of the drive shaft and is movable in the three directions. An electric motor is connected with an end of the coupling for rotating the drive shaft through the coupling.

9 Claims, 10 Drawing Sheets

ELECTRIC DISCHARGE MACHINING APPARATUS

BACKGROUND OF THE INVENTION

1. Field of the Invention

The present invention relates to an electric discharge machining apparatus that machines a work piece by means of an electric discharge generated by application of a voltage between a tool electrode and the work piece.

2. Description of the Related Art

A conventional electric discharge machining apparatus has hitherto been known in which a tool electrode is moved in an X-axis, a Y-axis and a Z-axis direction by using an electrode driving device with a magnetic bearing mechanism being applied to driving the tool electrode for electric discharge machining (for example, see a first patent document: International Publication No. 02/024389 A1).

In this conventional electric discharge machining apparatus, an electric motor by which the tool electrode is driven to rotate is incorporated in the electrode driving device.

In the electric discharge machining apparatus, however, the tool electrode is fixed to an end of a drive shaft that drives the tool electrode, and the drive shaft also serves as a rotor of the electric motor. As a result, the gross weight of the drive shaft is increased, so high-speed or fast responsive drivability of the tool electrode might sometimes be impaired, resulting in a problem that the rapidity or fastness of the machining speed is reduced.

In addition, the fast responsive drivability of the tool electrode can be obtained by increasing the attractions of electromagnetic portions of the magnetic bearing, that is, the value of current supplied to the electromagnetic portions. However, the amount of heat generated in the electromagnetic portions increases in accordance with the increasing current supplied, as a consequence of which the electrode driving device might sometimes be caused to thermally expand depending upon the amount of heat thus generated, giving rise to another problem that machining accuracy is reduced.

SUMMARY OF THE INVENTION

The present invention is intended to obviate the above-mentioned problems, and has for its object to provide an electric discharge machining apparatus having improved responsive drivability as well as improved machining speed.

Another object of the present invention is to provide an electric discharge machining apparatus in which an electrode driving device is prevented from thermal deformation due to the heat generation of electromagnetic portions, thereby making it possible to perform stable attraction control on the electromagnetic portions.

Bearing the above object in mind, the present invention resides in an electric discharge machining apparatus constructed as follows. A tool electrode has its tip end directed to a work piece with a voltage being applied between the tool electrode and the work piece to generate a discharge. A drive shaft is connected with the tool electrode. An electrode driving device has magnetic bearings for moving the drive shaft in three directions including a Z-axis direction that is an axial direction of the drive shaft, a Y-axis direction perpendicularly crossing the Z-axis direction, and an X-axis direction perpendicularly crossing the Y-axis direction and the Z-axis direction, by supplying electric current to electromagnetic portions to control magnetic attractions thereof. A movable coupling is connected with an end of the drive shaft and is movable in the three directions. An electric motor is connected with an end of the coupling for rotating the drive shaft through the coupling.

In the electric discharge machining apparatus according to the present invention, a mechanism for rotating the tool electrode is separated from the electrode driving device, and hence the weight of the drive shaft is greatly reduced, whereby fast responsive drivability of the tool electrode can be achieved.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings, with the same or corresponding members or parts being identified by the same symbols.

Embodiment 1.

Figure 1:
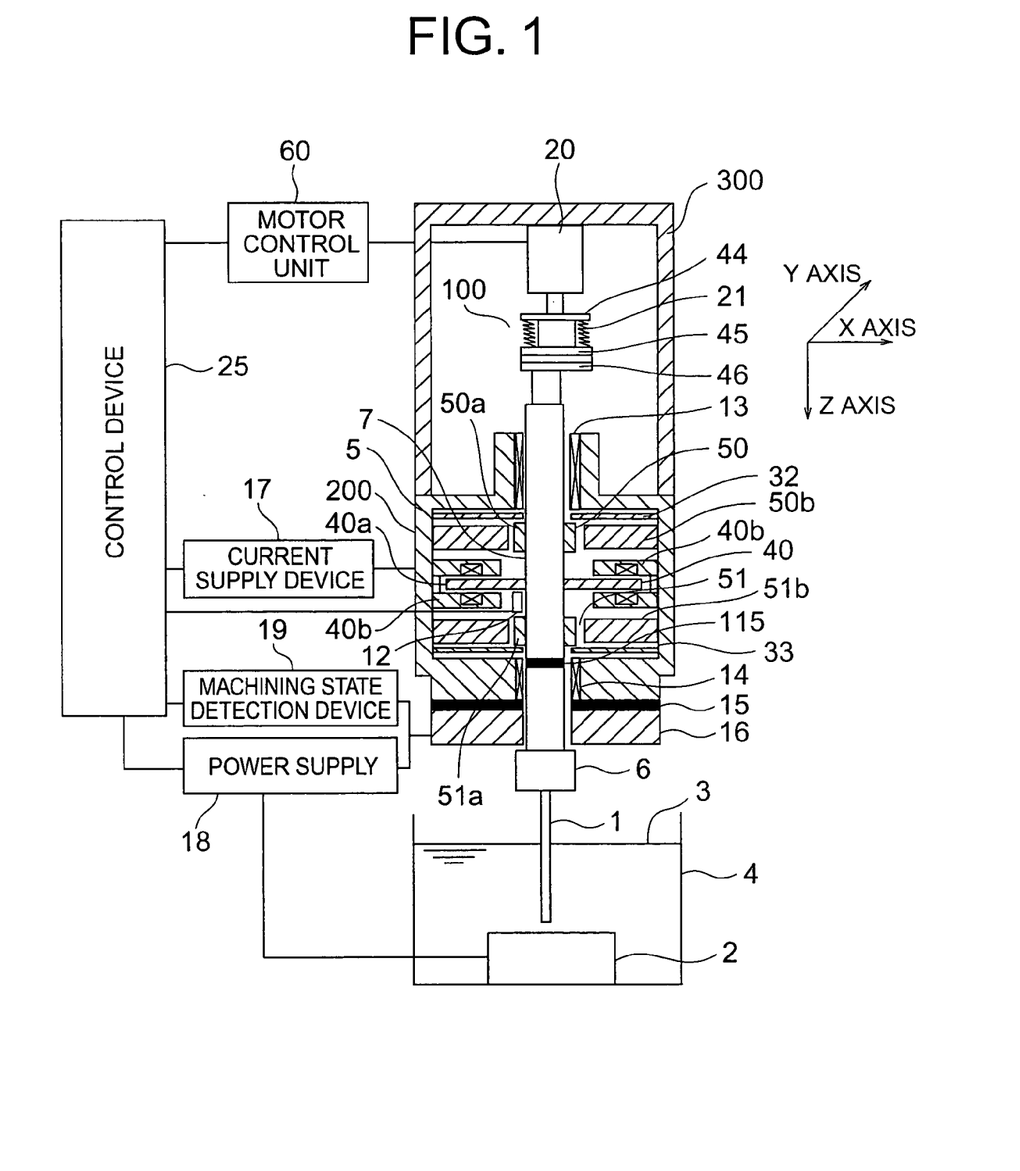
FIG. 1 is a constructional view of an electric discharge machining apparatus according to a first embodiment of the present invention.

FIG. 1 is a constructional view of an electric discharge machining apparatus according to a first embodiment of the present invention.

This electric discharge machining apparatus includes: a tool electrode 1 having its tip end directed to a work piece 2 disposed on the bottom of a machining tank 4 in which a working fluid in the form of an oil 3; a drive shaft 7 fixedly attached to the tool electrode 1 through an electrode mounting section 6 with an insulating plate 115 being interposed at an intermediate portion thereof; an electrode driving device 5 that drives the tool electrode 1 through the drive shaft 7; a feeder system 16 fixedly secured to the electrode driving device 5 through an insulating plate 15 formed of a ceramic disc for supplying electric power to the electrode driving device 5; a coupling 100 connected with the drive shaft 7 and being movable in three directions including a Z-axis direction (a top and bottom direction with respect to the plane of the drawing) that is an axial direction of the drive shaft 7, a Y-axis direction (a vertical direction with respect to the plane of the drawing) that perpendicularly crosses the Z-axis direction, and an X-axis direction (a right and left direction of the plane of the drawing) that perpendicularly crosses the Y-axis direction and the Z-axis direction; and an electric motor 20 connected with an end of the coupling 100 for rotating the drive shaft 7 through the coupling 100.

Figure 2:
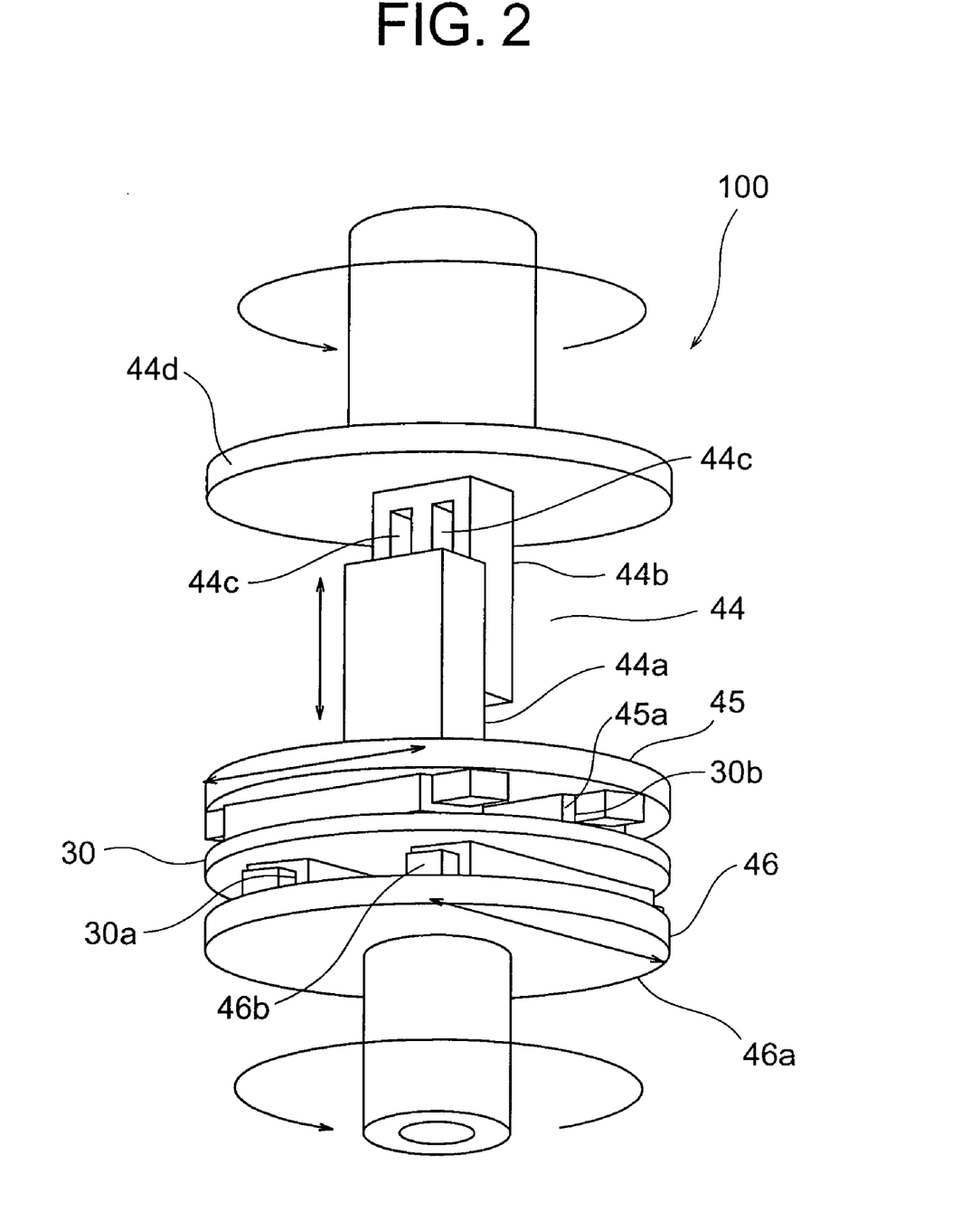
FIG. 2 is a perspective view of a coupling of FIG. 1.

FIG. 2 is a perspective view of the coupling 100 of FIG. 1.

The coupling 100 includes an X direction slider 46, a Y direction slider 45 connected with the X direction slider 46 and being movable in the Y direction, a Z direction slider 44 connected with the Y direction slider 45 and being movable in the Z direction, and a spring in the form of a coiled spring 21, though not shown in FIG. 2, arranged between the Y direction slider 45 and the Z direction slider 44.

The X direction slider 46 is fixedly attached to an end of the drive shaft 7 and has a disc portion 46a with a pair of protrusions 46b being formed on an upper surface thereof so as to extend in parallel thereto in the X-axis direction. The protrusions 46b are placed in sliding engagement with corresponding grooves 30a formed at a lower surface side of an intermediate disc portion 30. Also, the Y direction slider 45 has a pair of protrusions 45a formed on a lower surface thereof so as to extend in parallel thereto in the Y-axis direction, these protrusions 45a being placed into sliding engagement with corresponding grooves 30b formed at an upper surface side of the intermediate disc portion 30. The Z direction slider 44 has a first vertically extending guide portion 44a fixedly attached at its one end to an upper surface of the Y direction slider 45. The first guide portion 44a has a pair of protrusions (not shown) which are placed into sliding engagement with corresponding grooves 44c formed in a second vertically extending guide portion 44b of the Z direction slider 44. This second guide portion 44b is fixedly attached to a disc portion 44d of the Z direction slider 44.

The electric discharge machining apparatus further includes a power supply. 18 for applying a voltage between the tool electrode 1 and the work piece 2, a machining state detection device 19 for detecting an interterminal voltage corresponding to a relative distance between the tool electrode 1 and the work piece 2, a current supply device 17 for supplying electric power to the electrode driving device 5, a motor control unit 60 electrically connected to the electric motor 20 for controlling the number of revolutions per minute or the rotational speed of the electric motor 20, a control device 25 electrically connected to the power supply 18, the machining state detection device 19, the current supply device 17 and the motor control unit 60, respectively, for controlling the driving operation of the tool electrode 1, and an insulating plate 15 disposed between the electrode driving device 5 and the feeder system 16 so as to prevent electric current from flowing from the power supply 18 to the electrode driving device 5 as well as to prevent electric current from flowing from the current supply device 17 to the feeder system 16.

The above-mentioned electrode driving device 5 includes a thrust magnetic bearing 40 arranged to surround the drive shaft 7 in a housing 200, a pair of radial magnetic bearings 50, 51 arranged around the drive shaft 7 so as to sandwich the thrust magnetic bearing 40 therebetween, a pair of auxiliary or guide bearings 13, 14 arranged between the housing 200 and the drive shaft 7, a pair of radial position detection portions 32, 33 for detecting the radial position of the drive shaft 7, and a thrust position detection part 12 for detecting the thrust position of the drive shaft 7.

The above-mentioned thrust magnetic bearing 40 includes a disk-shaped attraction plate 40a made of a magnetic material and fixedly mounted on the drive shaft 7, and a pair of electromagnetic portions 40b arranged in opposition to the opposite side surfaces, respectively, of the attraction plate 40a.

The above-mentioned radial magnetic bearings 50, 51 respectively include attraction portions 50a, 51a made of a magnetic material and fixedly attached to the drive shaft 7, and electromagnetic portions 50b, 51b arranged to surround the circumferences of the attraction portions 50a, 51a, respectively, with an annular clearance formed therebetween.

Next, the operation of the electric discharge machining apparatus as constructed above will be described below.

First of all, reference will be made to the movements of the tool electrode 1 in thrust and radial directions.

When a voltage is applied from the power supply 18 between the tool electrode 1 and the work piece 2, an interterminal voltage corresponding to the relative distance between the tool electrode 1 and the work piece 2 is measured by the machining state detection device 19. An amount of correction for the position of the tool electrode 1 corresponding to a deviation between the measured interterminal voltage and a target interterminal voltage is calculated by the control device 25.

On the other hand, in the electrode driving device 5, the current position of the attraction plate 40a is measured by the thrust position detection part 12. Since the attraction plate 40a of the thrust magnetic bearing 40 is mounted on the drive shaft 7 and the tool electrode 1 is also mounted on the drive shaft 7 through the electrode mounting section 6, the thrust position of the tool electrode 1 is adjusted by controlling the position of the attraction plate 40a.

When the detected value of the thrust position detection part 12 is input to the control device 25, the amount of movement of the attraction plate 40a and the amount of attraction required to position the attraction plate 40a at a prescribed position are determined by the control device 25 from the deviation between the target position and the current position of the tool electrode 1, whereby the values of currents to be supplied to the electromagnetic portions 40b are calculated by the control device 25. Thereafter, the output current values are commanded to the current supply device 17 by the control device 25, so that the electric currents thus commanded are supplied from the current supply device 17 to the electromagnetic portions 40b. As a result, the attraction plate 40a sandwiched between the electromagnetic portions 40b is attracted to either one of the electromagnetic portions 40b whereby the drive shaft 7 is driven to move in the thrust direction.

In addition, the current positions of the radial magnetic bearings 50, 51 are measured by the radial position detection portions 32, 33. Since the attraction portions 50a, 51a of the radial magnetic bearings 50, 51 are mounted on the drive shaft 7 and the tool electrode 1 is also mounted on the drive shaft 7 through the electrode mounting section 6, the radial position of the tool electrode 1 is adjusted by controlling the radial positions of the magnetic bearings 50, 51.

When the detected values of the radial position detection portions 32, 33 are input to the control device 25, the amounts of movement of the attraction portions 50a, 51a and the amounts of attractions required to magnetically support and position the attraction portions 50a, 51a at their prescribed positions are determined by the control device 25 from the deviation between the target position and the current position of the tool electrode 1, whereby the values of currents supplied to the electromagnetic portions 50b, 51b are calculated. Thereafter, the output current values are commanded to the current supply device 17 by the control device 25, so that the electric currents thus commanded are supplied from the current supply device 17 to the electromagnetic portions 50b, 51b. As a result, the attraction portions 50a, 51a are magnetically attracted by the electromagnetic portions 50b, 51b, whereby the drive shaft 7 is driven to move in the radial direction.

In this manner, the fast response and driving of the tool electrode 1 in the thrust and radial directions is achieved by controlling the values of currents supplied to the electromagnetic portions 40b of the thrust magnetic bearing 40 and the electromagnetic portions 50b, 51b of the radial magnetic bearings 50, 51 to change the magnetic attractions thereof.

Turning now to the rotational operation of the tool electrode 1, a rotation command from the control device 25 is input to the motor control unit 60, which then controls the number of revolutions per minute or rotational speed of the electric motor 20. Thereafter, the rotational torque of the electric motor 20 is transmitted to the drive shaft 7 through the coupling 100, whereby the tool electrode 1 is driven to rotate through the electrode mounting section 6.

Thus, according to the electric discharge machining apparatus as constructed above, the tool electrode 1 is driven, on one hand, to rotate by the rotational torque from the electric motor 20, and on the other hand, to move in the radial direction by the magnetic forces of the electromagnetic portions 50b, 51b of the radial magnetic bearings 50, 51. In addition, the tool electrode 1 is also driven to move in the thrust direction under the action of the magnetic forces of the electromagnetic portions 40b of the thrust magnetic bearing 40, as a consequence of which it is possible to responsively drive the tool electrode 1 at high speeds in all the directions including the X-axis, Y-axis and Z-axis directions.

Here, note that even in a state where the rotation of the electric motor 20 is stopped by a signal from the motor control unit 60, the tool electrode 1 can be driven to move responsively at high speeds in all the X-axis, Y-axis and Z-axis directions.

Moreover, since the mechanism for rotating the tool electrode 1 is separated from the electrode driving device 5, the weight of the drive shaft 7 is greatly reduced and hence the responsive drivability of the tool electrode 1 is greatly improved, as compared with the prior art in which a drive shaft acts as the rotor of an electric motor.

Furthermore, though the electric motor 20 is fixedly attached to the top surface of a casing 300, the X direction slider 46, the Y direction slider 45 and the intermediate disc portion 30 are all urged in a direction toward the electric motor 20 by means of the resilient force of the coiled spring 21, and the urging or resilient force of the coiled spring 21 is substantially equal in strength to the force counterbalancing the total load of the X direction slider 46, the Y direction slider 45 and the intermediate disc portion 30. As a result, the influence of the thrust load of the drive shaft 7 due to the self-weights of the X direction slider 46, the Y direction slider 45 and the intermediate disc portion 30 can be suppressed to a low level.

Although in the above-mentioned embodiment, the coupling 100 comprises the X direction slider 46, the intermediate disc portion 30, the Y direction slider 45 and the Z direction slider 44, it may be an other type of coupling, e.g., a universal joint such as a torque tube, a flexible shaft, or the like.

Further, the arrangement of the X direction slider 46 and the Y direction slider 45 of the coupling 100 may be opposite or reversed.

Embodiment 2.

Figure 3:
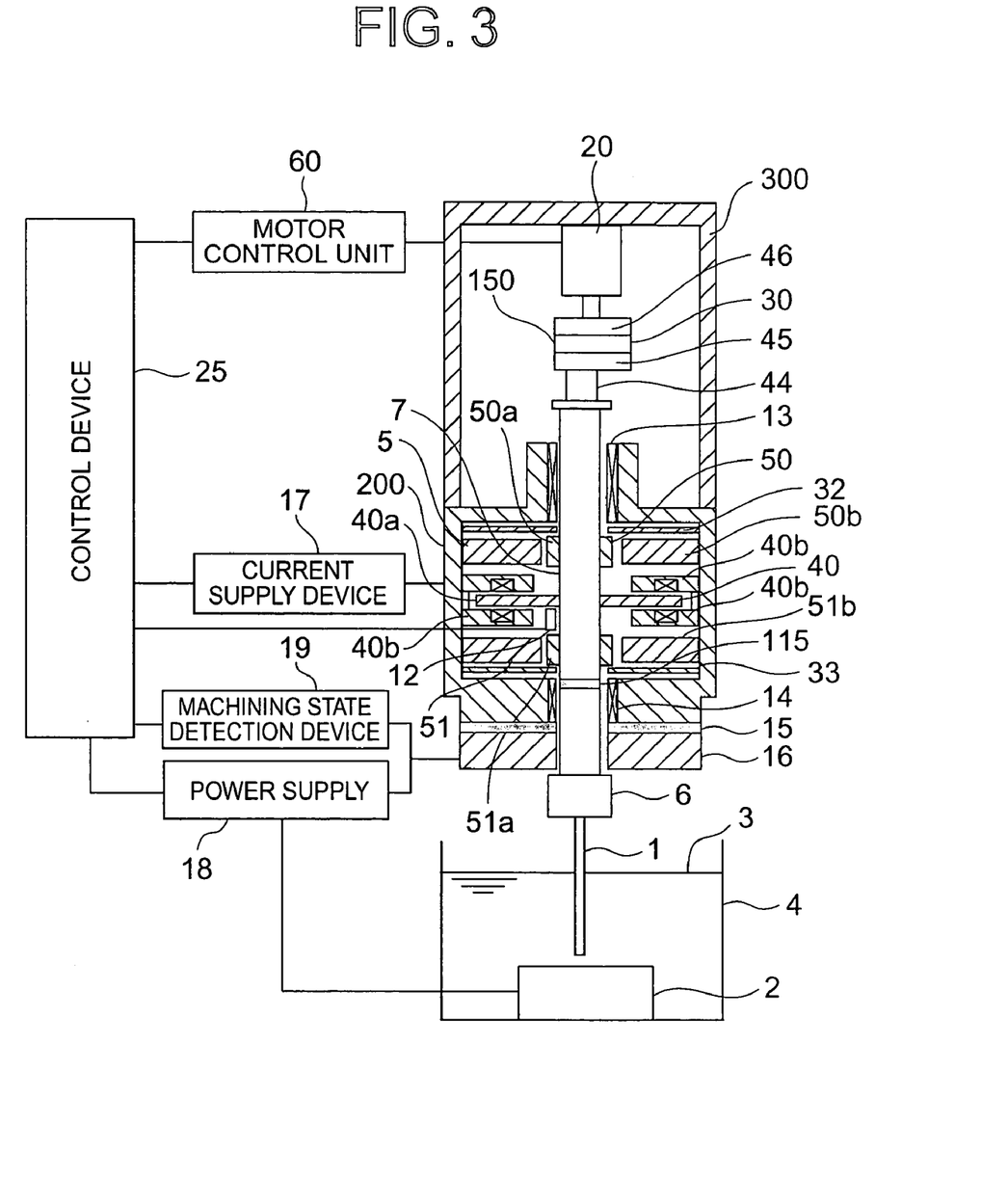
FIG. 3 is a constructional view of an electric discharge machining apparatus according to a second embodiment of the present invention.

FIG. 3 is a constructional view of an electric discharge machining apparatus according to a second embodiment of the present invention.

This second embodiment is similar in construction to the first embodiment excluding the following: that is, the construction of a coupling 150 is different from the coupling 100 of the first embodiment, and the spring 21 of the first embodiment is omitted.

In this second embodiment, the coupling 150 is constructed as follows. The Z direction slider 44 is mounted on an upper end portion of the drive shaft 7, and the Y direction slider 45 is mounted on the Z direction slider 44, and the X direction slider 46 is mounted on the Y direction slider 45 through the intermediate disc portion 30. The electric motor 20 has its rotation shaft connected with the X direction slider 46.

The coupling 150 is constructed such that the arrangement of the Z direction slider 44 and the X direction slider 46 is reversed in comparison with that of the first embodiment.

In case of this coupling 150, the total load of the X direction slider 46, the Y direction slider 45 and the intermediate disc portion 30 is supported by the electric motor 20 fixedly mounted on the casing 300, so the load does not act on the drive shaft 7. Accordingly, there is no more necessity for the spring 21 of the first embodiment, which is needed to suppress the influence of the thrust load of the drive shaft 7 due to the self-weights of the X direction slider 46, the Y direction slider 45 and the intermediate disc portion 30 to a low level.

Embodiment 3.

Figure 4:
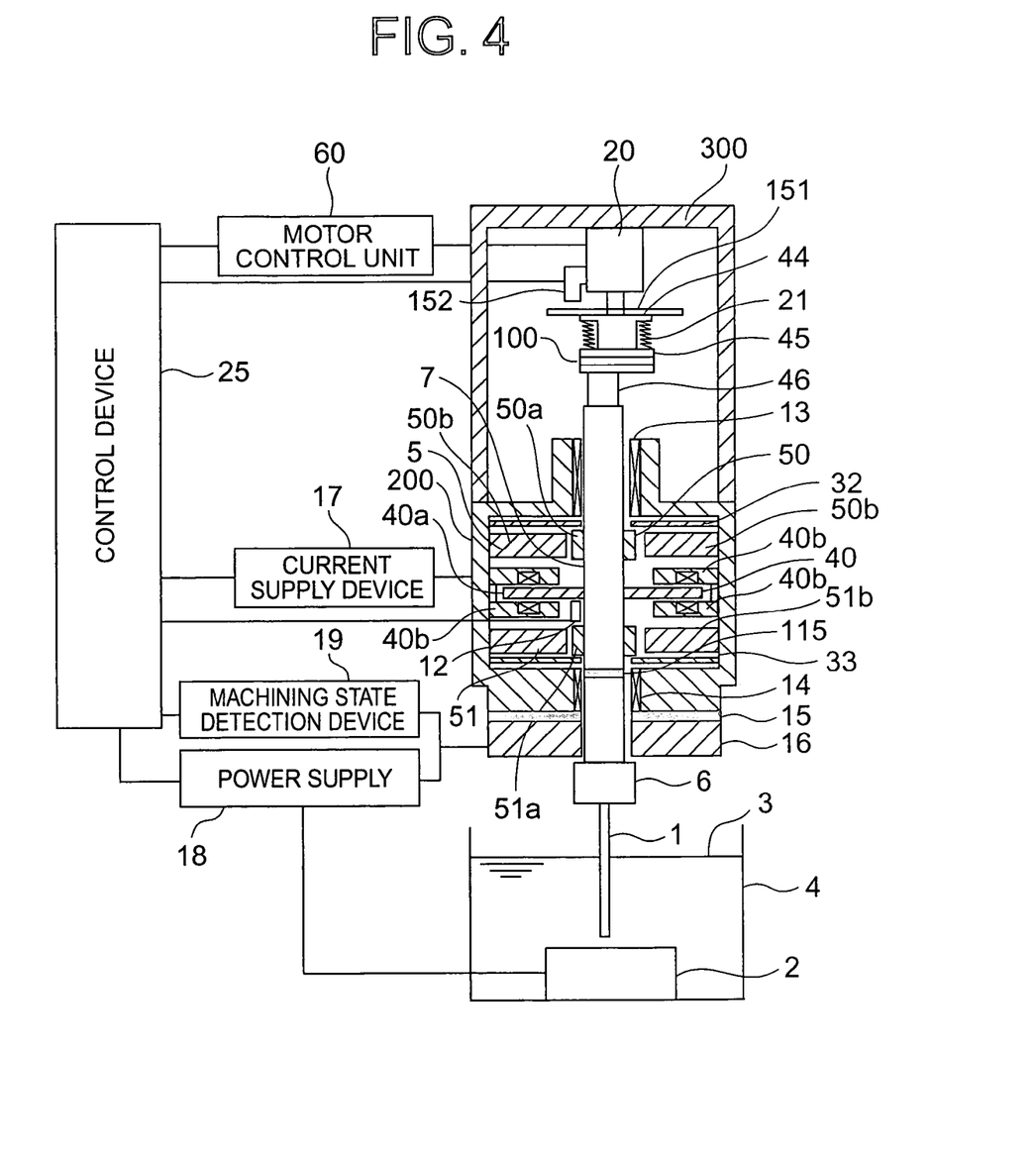
FIG. 4 is a constructional view of an electric discharge machining apparatus according to a third embodiment of the present invention.

FIG. 4 is a constructional view of an electric discharge machining apparatus according to a third embodiment of the present invention.

In this third embodiment, a rotational position scale 151 is mounted on the Z direction slider 44 at a location between the Z direction slider 44 and the electric motor 20 with its central axis being in coincidence with the axis of rotation of the electric motor 20, and a rotational position scale reader 152 is mounted on the electric motor 20. Here, note that the rotational position scale 151 and the rotational position scale reader 152 together constitute a rotation detection unit for detecting rotation information of the drive shaft 7.

The construction of this third embodiment other than the above is the same as that of the electric discharge machining apparatus according to the first embodiment.

In this third embodiment, the rotational position scale reader 152 reads out the current angle or angular velocity of the central axis of the drive shaft 7 from the rotational position scale 151, and generates a corresponding detection signal which is input to the control device 25. Thereafter, a rotational angle command for the drive shaft 7 is generated by the control device 25 and output therefrom to the motor control unit 60, so that the number of revolutions per minute or rotational speed of the electric motor 20 is controlled by the motor control unit 60. As a result, the rotational torque of the electric motor 20 is transmitted to the tool electrode 1 through the coupling 100, the drive shaft 7 and the electrode mounting section 6, whereby the tool electrode 1 is driven to rotate.

In the electric discharge machining apparatus of this third embodiment, since the rotation of the drive shaft 7 is controlled according to the rotation information of the drive shaft 7 detected by the rotation detection unit, it is possible to improve the rotational accuracy of the tool electrode 1.

Embodiment 4.

Figure 5:
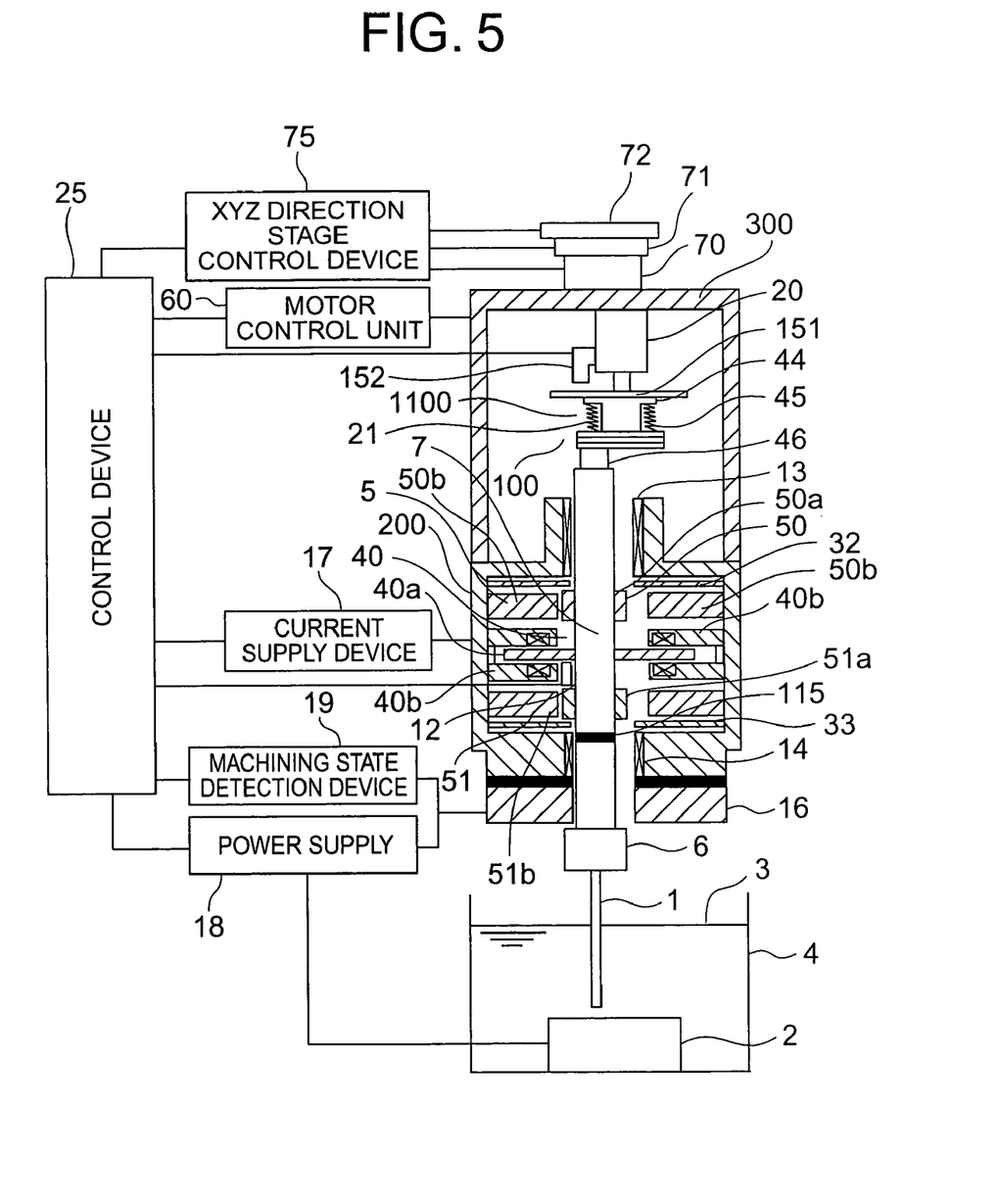
FIG. 5 is a constructional view of an electric discharge machining apparatus according to a fourth embodiment of the present invention.

FIG. 5 is a constructional view of an electric discharge machining apparatus according to a fourth embodiment of the present invention.

Although the driving or moving range of the tool electrode 1 is about hundreds of microns in the electrode driving device 5 of the electric discharge machining apparatus according to the first through third embodiments, in cases where the X, Y and Z direction sliders are used as they are when the driving range is 1 millimeter or more, the structure of the coupling is enlarged, making it difficult to provide fast responsive driving of the drive shaft 7.

In the case of such an electric discharge machining apparatus with a wide driving range, however, the amplitude or localized stroke of movement of the drive shaft 7 is about hundreds of microns corresponding to an interterminal distance control amount for discharge machining, and hence there is no necessity for fast responsive driving in the entire diving range of the drive shaft 7, but instead it is sufficient for the drive shaft 7 to have high-speed or fast response within such a limited amplitude of about hundreds of microns over the entire driving range. Therefore, the speed at which the drive shaft 7 is travelling over the entire driving range is about 30 mm/min, so the electric motor 20 only has to be able to follow this speed.

In this fourth embodiment, a Z direction stage 70, being movable in the Z direction, is mounted on the casing 300. The electric motor 20 is mounted on the Z direction stage 70. In addition, a Y direction stage 71 is mounted on the Z direction stage 70, and an X direction stage 72 is mounted on the Y direction stage 71. Here, note that the positional relation between the X direction stage 72 and the Y direction stage 71 may be opposite or reversed.

The X direction stage 72, the Y direction stage 71 and the Z direction stage 70 are connected to an XYZ direction stage control device 75, which is in turn connected to the control device 25. Here, note that the X direction stage 72, the Y direction stage 71 and the Z direction stage 70 together constitute a transportation unit for transporting or moving the electric motor 20 in the X-axis direction, in the Y-axis direction and in the Z-axis direction, respectively.

In this embodiment, the central position of the drive shaft 7 is detected by the radial position detection portions 32, 33 and the thrust position detection part 12. When a deviation between the detected position of the central axis of the drive shaft 7 and the position of the central axis of the rotation shaft of the electric motor 20 becomes equal to or greater than a prescribed value, the control device 25 outputs a command for driving the X direction stage 72, the Y direction stage 71 and the Z direction stage 70 to the XYZ direction stage control device 75 so as to correct the deviation. The XYZ direction stage control device 75, upon receipt of this command, drives the X direction stage 72, the Y direction stage 71 and the Z direction stage 70 to move to their prescribed positions, respectively.

According to this electric discharge machining apparatus, even if the driving range of the tool electrode 1 is large, the coupling 100 connecting the electric motor 20 and the drive shaft 7 with each other, the rotational position scale 151 and the rotational position scale reader 152 can be the ones similar to those used in the above-mentioned third embodiment, and the tool electrode 1 is not reduced in its fast responsive drivability, so it becomes possible to perform rotational operation and a wide range of feed operation of the tool electrode 1.

Embodiment 5.

Figure 6:
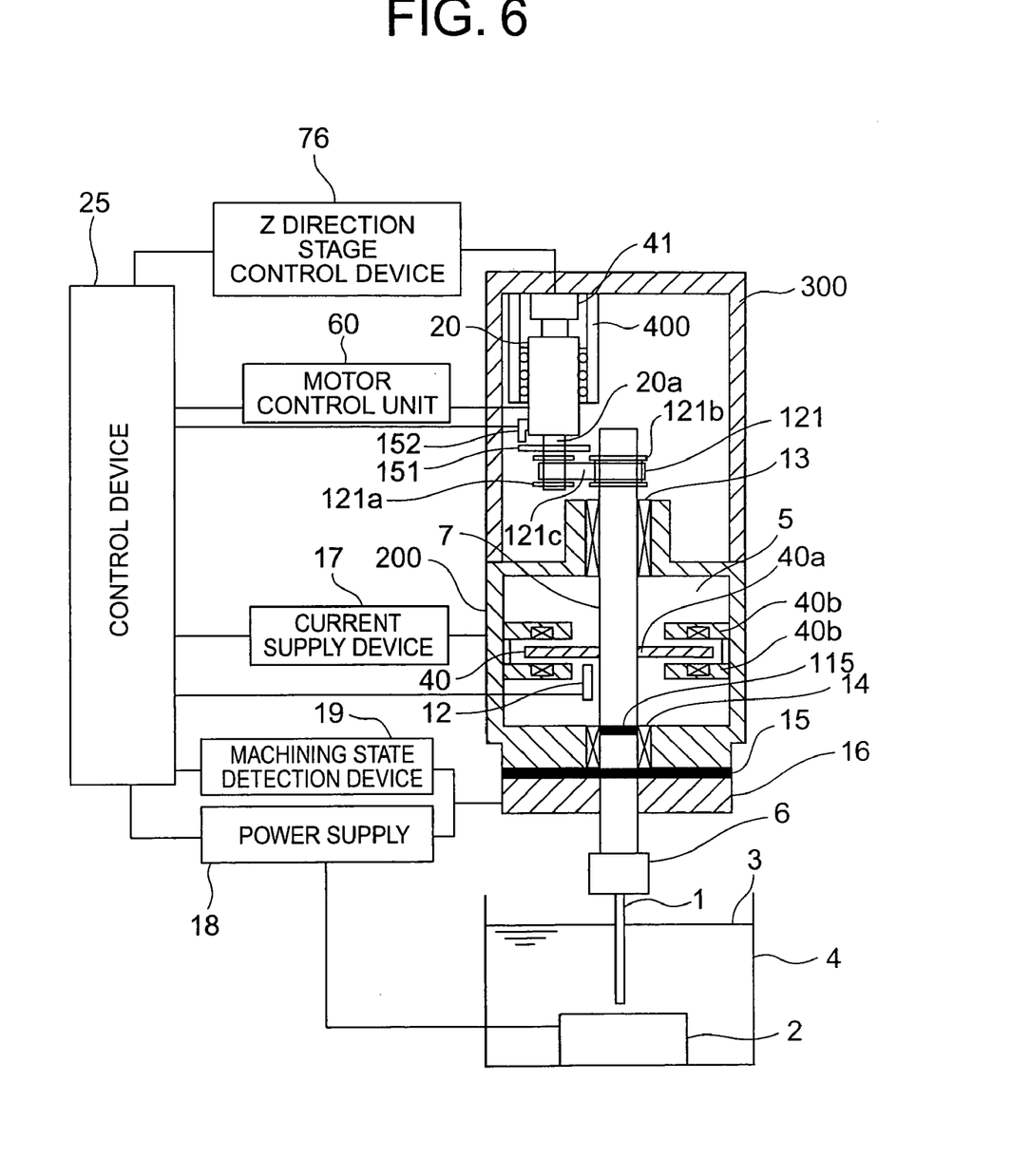
FIG. 6 is a constructional view of an electric discharge machining apparatus according to a fifth embodiment of the present invention.

FIG. 6 is a constructional view of an electric discharge machining apparatus according to a fifth embodiment of the present invention.

In this fifth embodiment, the driving of the tool electrode 1 in the radial direction is restricted by the auxiliary or guide bearings 13, 14.

In addition, a rotation transmission mechanism 121 is arranged between an end of a rotation shaft 20a of the electric motor 20 and the drive shaft 7 for transmitting the rotation of the rotation shaft 20a to the drive shaft 7. The rotation transmission mechanism 121 includes a pulley 121a fixedly mounted on the rotation shaft 20a of the electric motor 20, a wrapping portion 121b fixedly mounted on an end portion of the drive shaft 7, and a timing belt 121c wrapped between the pulley 121a and the wrapping portion 121b. The tension of the timing belt 121c can be properly adjusted in such a manner that the rotation transmission mechanism 121 does not resist the fast response driving of the drive shaft 7 in the thrust direction, and the rotational torque of the rotation shaft 20a can be transmitted to the drive shaft 7.

Here, note that a gear transmission mechanism can be used as the rotation transmission mechanism 121, and in this case, it is preferred that a clearance or backlash of about 300 microns for instance be provided between gear wheels in mesh with each other. Also, a torque tube or a flexible shaft may be used as the rotation transmission mechanism 121.

In addition, a Z direction stage 41 is fixedly attached at one end thereof to the casing 300 and at the other end thereof with the electric motor 20. Connected to the Z direction stage 41 is a Z direction stage control device 76, which is in turn connected to the control device 25. The electric motor 20 is guided to move in the Z direction by means of a guide 400.

In the electric discharge machining apparatus of this fifth embodiment, when the driving range in the Z-axis direction of the drive shaft 7 is equal to or greater than 1 millimeter for instance and when a deviation between the position of the pulley 121a of the rotation transmission mechanism 121 mounted on the rotation shaft 20a of the electric motor 20 and the thrust position of the drive shaft 7 or the position of the wrapping portion 121b detected by the thrust position detection part 12 is equal to or greater than a prescribed value, the control device 25 outputs a command for driving the Z direction stage 41 to the Z direction stage control device 76 so as to correct the deviation. The Z direction stage control device 76, upon receipt of the command, drives the Z direction stage 41 to move to a prescribed position, in accordance with which the electric motor 20 is also caused to move in the Z direction under the guidance of the guide 400.

Moreover, the current angle or angular velocity of the center of the drive shaft 7 is detected from the rotational position scale 151 by means of the rotational position scale reader 152, and input to the control device 25. Then, a rotation command for the drive shaft 7 is generated by the control device 25 and output therefrom to the motor control unit 60, so that the number of revolutions per minute or rotational speed of the electric motor 20 is controlled by the motor control unit 60. As a result, the rotational torque of the electric motor 20 is transmitted to the drive shaft 7 through the rotation transmission mechanism 121, whereby the drive shaft 7 is rotated at a prescribed angular velocity or rotational speed.

According to the electric discharge machining apparatus of this fifth embodiment, even if the driving range in the Z-axis direction of the tool electrode 1 is large, the weight of the drive shaft 7 is reduced as in the first through fourth embodiments, and the tool electrode 1 is not reduced in its fast responsive drivability, so it becomes possible to perform rotational operation and a wide range of feed operation of the tool electrode 1.

Embodiment 6.

Figure 7:
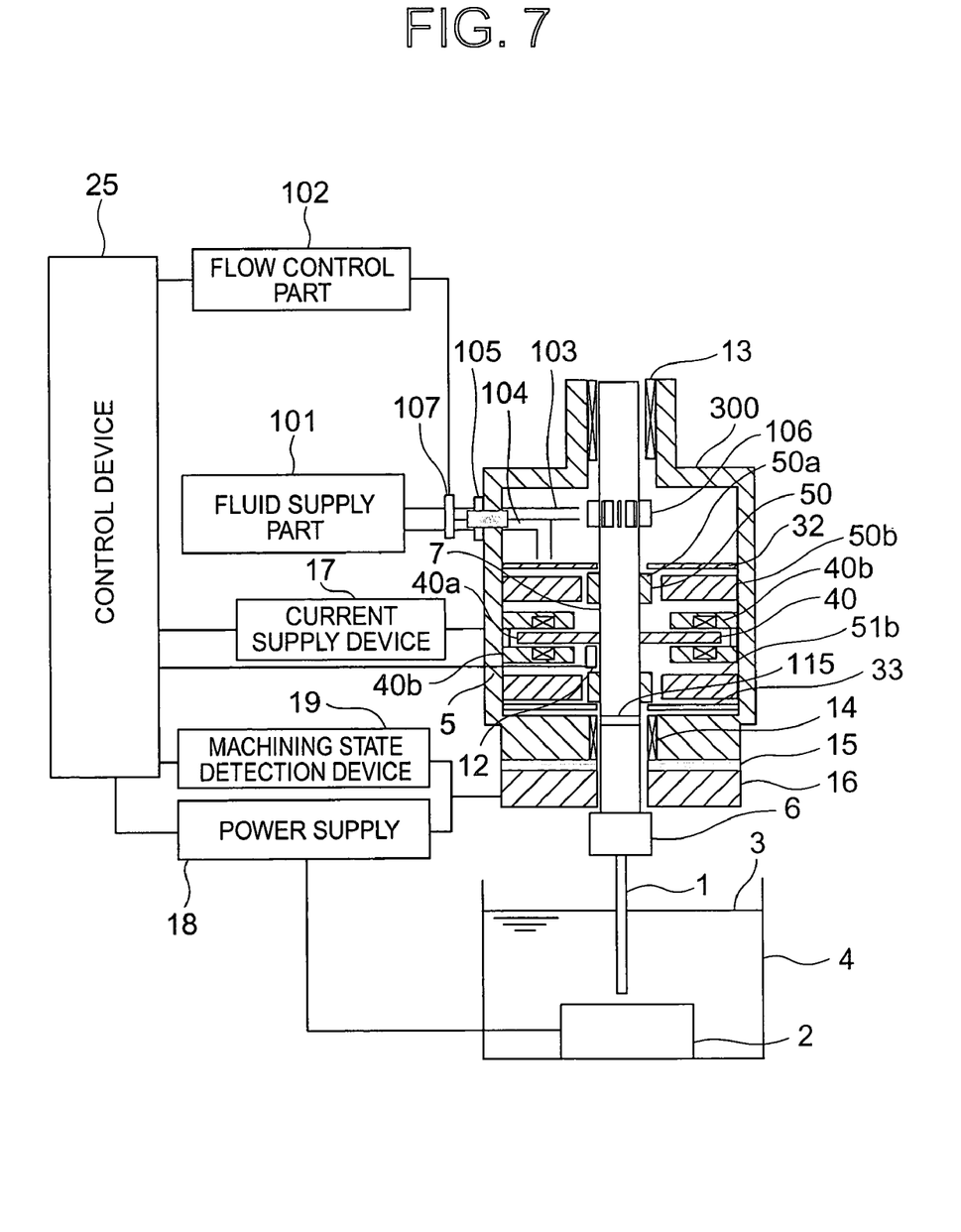
FIG. 7 is a constructional view of an electric discharge machining apparatus according to a sixth embodiment of the present invention.
Figure 8:
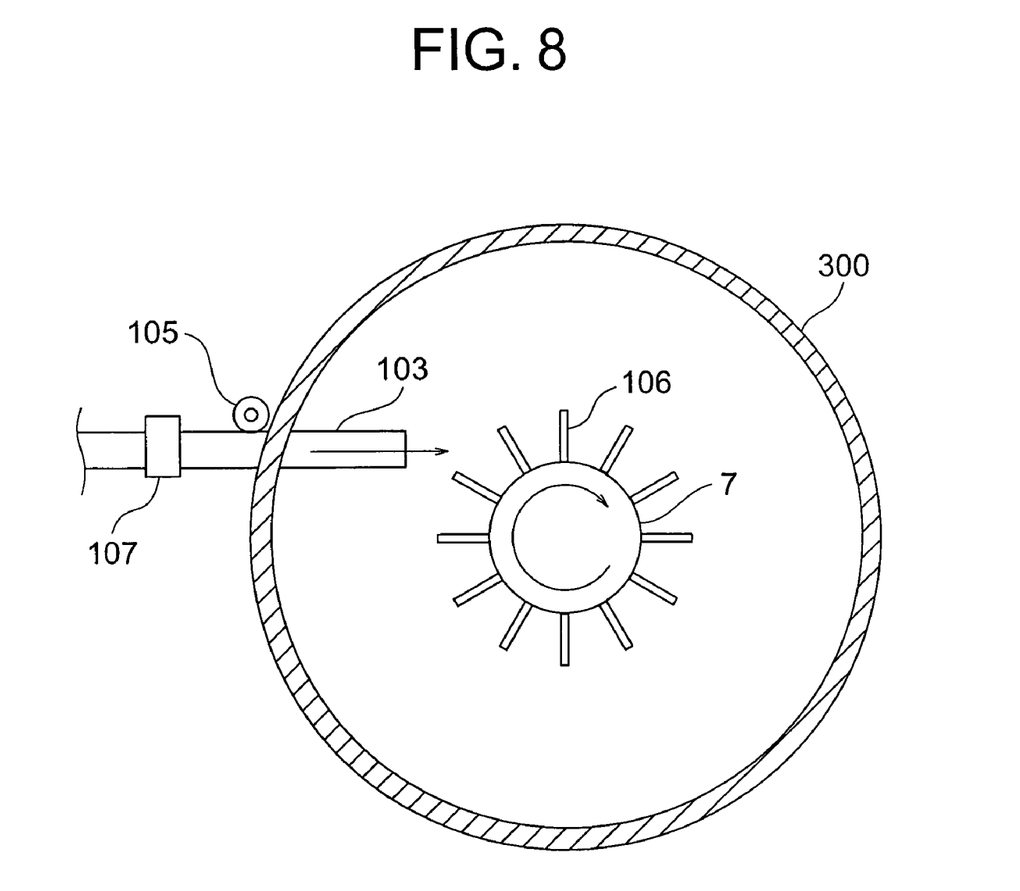
FIG. 8 is a plan view of essential portions of FIG. 7.

FIG. 7 is a constructional view of an electric discharge machining apparatus according to a sixth embodiment of the present invention, and FIG. 8 is a plan view of essential portions of FIG. 7.

This electric discharge machining apparatus includes a fluid supply part 101, a flow control valve 107 connected with the fluid supply part 101 for controlling the flow rate of fluid supplied therefrom, a plurality of blades 106 fixedly secured to and radially extending from the drive shaft 7, a rotation driving conduit 103 having a tip end thereof directed to the blades 106 and being deformable by a rotational direction changing part 105, a cooling conduit 104 having a tip end thereof directed to the electromagnetic portions 40b, 50b, 51b for cooling them, and a flow control part 102 having one end thereof connected to the flow control valve 107 and the other end thereof connected to the control device 25.

Here, note that when the diameter of the drive shaft 7 is 20 mm for instance, twelve blades 106, each comprising a plate of about 15 mm in height, about 15 mm in width and about 1 mm in thickness, are attached to the drive shaft 7.

In the electric discharge machining apparatus as constructed above, a command value for the flow rate of fluid is transmitted from the control device 25 to the fluid control part 102, which then controls the flow control valve 107 in such a manner that the flow rate of fluid supplied from the fluid supply part 101 to the rotation driving conduit 103 and the cooling conduit 104 is properly adjusted.

The fluid from the rotation driving conduit 103 is sprayed onto the blades 106 of the drive shaft 7 thereby to push and rotate the blades 106, so that the drive shaft 7 is driven to rotate together with the rotation of the blades 106. Thus, the number of revolutions per minute or rotational speed of the drive shaft 7 is controlled by adjusting the flow rate of fluid by means of the flow control valve 107.

Figure 9:
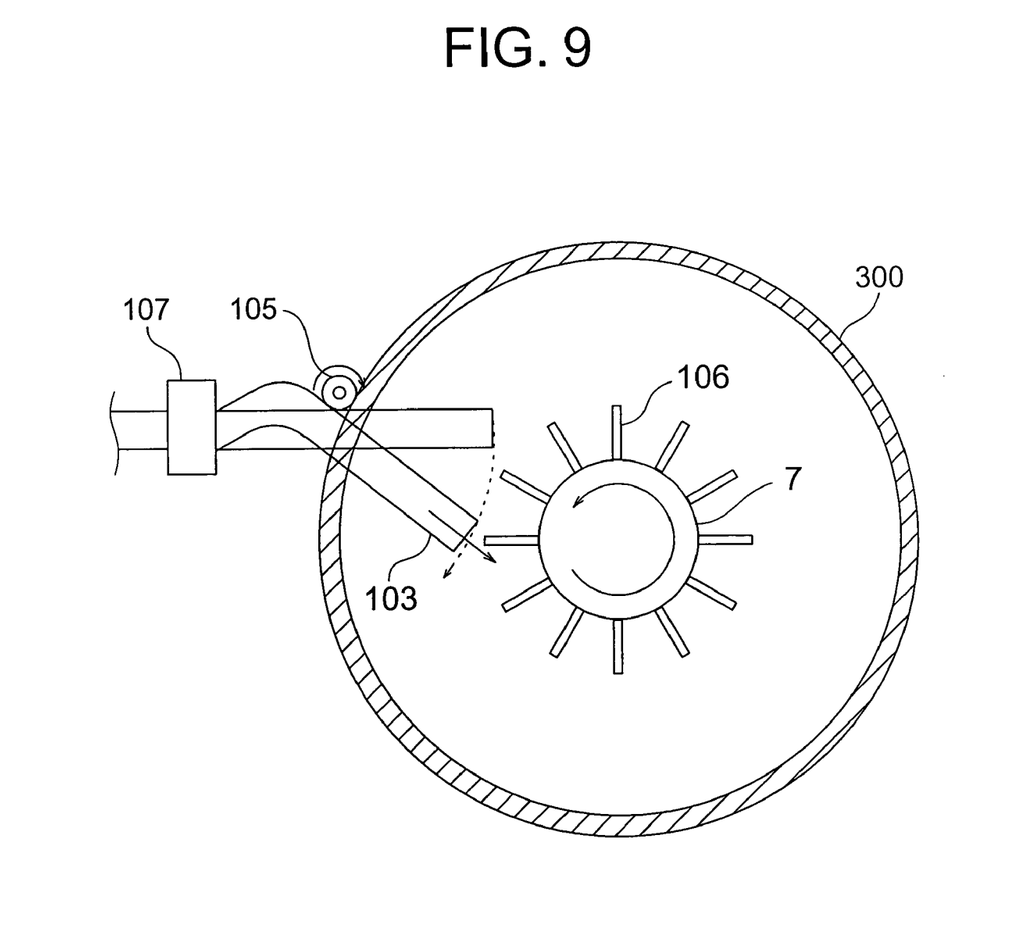
FIG. 9 is a view showing one form of use of a rotation driving conduit of FIG. 8.

In this connection, when the rotational direction of the drive shaft 7 is to be changed to the opposite or reverse direction, the rotational direction changing part 105 is operated to change the position of the tip end of the cooling conduit 104, as shown in FIG. 9.

In addition, the fluid from the cooling conduit 104 is sprayed onto the electromagnetic portions 40b, 50b, 51b, so that the electromagnetic portions 40b, 50b, 51b are thereby cooled. The fluid supplied from the rotation driving conduit 103 and the cooling conduit 104 is discharged to the outside from discharge ports (not shown) formed through the casing 300.

The discharge ports are arranged at locations in the casing 300 diagonal to those portions thereof at which the conduits 103, 104 extend through the casing 300, so that the fluid in the casing 300 can flow without stagnation.

In this sixth embodiment, air of about 5 atm., for instance, is used as the fluid so as to rotate the drive shaft 7 as well as to cool the electromagnetic portions 40b, 50b, 51b. In this regard, it is preferred that the fluid supplied to the cooling conduit 104 be once cooled to a low temperature by means of a cooling system (not shown), and then supplied to the electromagnetic portions 40b, 50b, 51b, thereby making it possible to improve the cooling effect.

According to the electric discharge machining apparatus of this sixth embodiment. the mechanism for driving the drive shaft 7 to rotate comprises a rotary drive mechanism utilizing fluid pressure, and the mechanism for rotating the tool electrode 1 is separated from the electrode driving device 5. With such a construction, the weight of the drive shaft 7 can be greatly reduced, as compared with a conventional electric discharge machining apparatus having a drive shaft which acts as a rotor of an electric motor. As a consequence, it is possible to achieve fast responsive drivability of the tool electrode 1.

Moreover, the fluid is also used for cooling the electromagnetic portions 40b, 50b, 51b thereby to prevent thermal deformation of the electromagnetic portions 40b, 50b, 51b, so that stable magnetic attraction control on the electromagnetic portions 40b, 50b, 51b can be made, thus improving the machining accuracy.

Though not described in this embodiment, even in an electric discharge machining apparatus in which the driving of a tool electrode in the radial direction is restricted by auxiliary or guide bearings while permitting the tool electrode to move in the Z-axis direction alone, as in the above-mentioned fifth embodiment, it may be constructed such that a drive shaft is driven to rotate by spraying fluid onto a plurality of blades attached to the drive shaft.

Embodiment 7.

Figure 10:
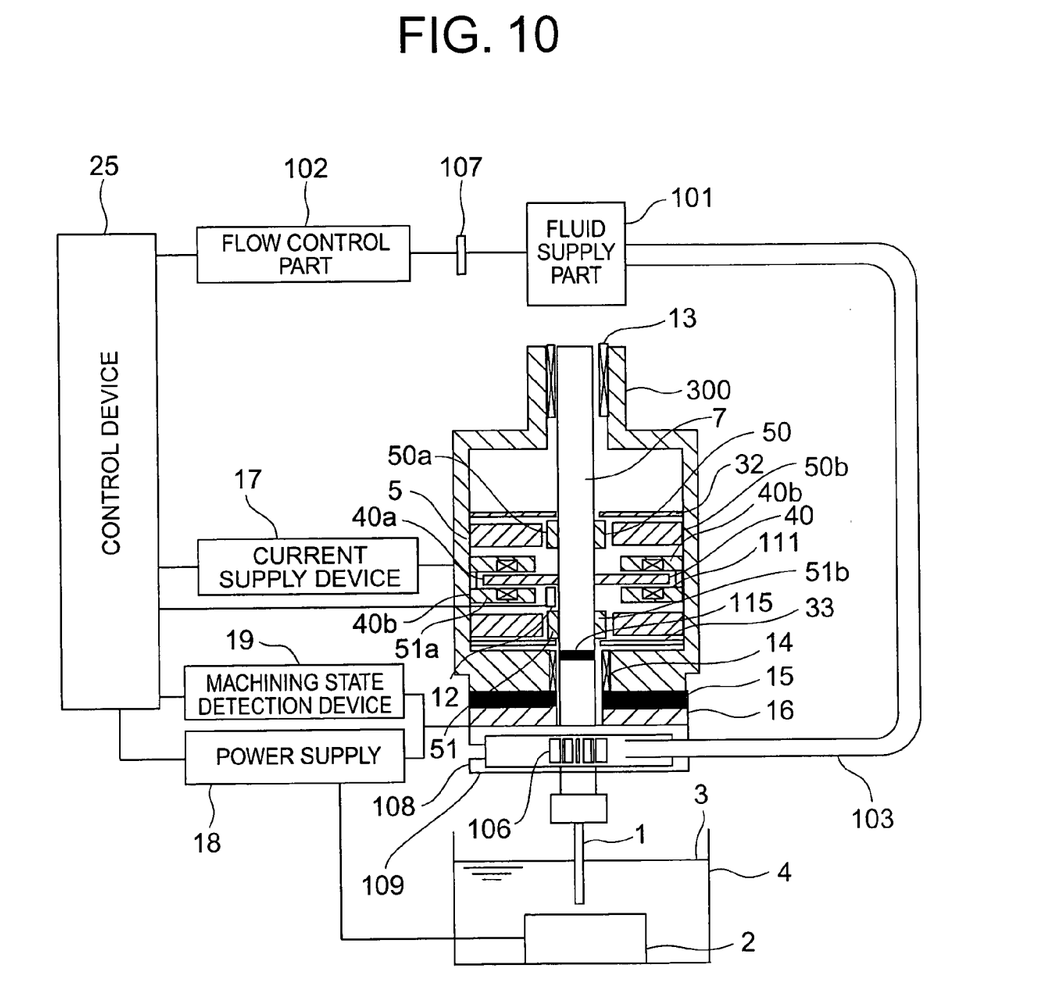
FIG. 10 is a constructional view of an electric discharge machining apparatus according to a seventh embodiment of the present invention.

FIG. 10 is a constructional view of an electric discharge machining apparatus according to a seventh embodiment of the present invention.

In this seventh embodiment, as compared with the above-mentioned sixth embodiment, the main difference is that the blades 106 are fixedly attached to a lower end portion of the drive shaft 7.

That is, in this electric discharge machining apparatus, a blade cover 109 is mounted on the feeder system 16, and the blades 106 are attached to the lower end portion of the drive shaft 7 inside the blade cover 109. The blade cover 109 is connected to the fluid supply part 101 through the rotation driving conduit 103. The fluid supply part 101 is connected through the flow control valve 107 to the flow control part 102, which is in turn connected to the control device 25.

In the electric discharge machining apparatus according to this seventh embodiment, the flow control part 102 controls the flow control valve 107 in accordance with a rotation command for the drive shaft 7 from the control device 25, whereby the amount of fluid supplied from the fluid supply part 101 is properly adjusted. The fluid supplied from the fluid supply part 101 is introduced into the blade cover 109 through the rotation driving conduit 103 to rotate the blades 106, whereby the drive shaft 7 is driven to rotate. The fluid having served to rotate the blades 106 is discharged from the blade cover 109 through a fluid discharge port 108 to the outside.

Here, it is to be noted that the number of revolutions per minute or rotational speed of the drive shaft 7 is controlled by adjusting the flow rate of fluid by means of the flow control valve 107.

According to the electric discharge machining apparatus of this seventh embodiment, the advantageous effects similar to those obtained in the above-mentioned sixth embodiment can be achieved. In addition, since the blades 106 are arranged in the neighborhood of the tool electrode 1, lateral or horizontal fluctuations of the rotation axis of the tool electrode 1 can be suppressed to low levels.

Moreover, there is a space around an upper portion of the drive shaft 7, too, for mounting the blades 106, and hence by applying a rotational force to the drive shaft 7 at two points apart from each other, it becomes possible to rotate the drive shaft 7 in a more stable manner.

While the invention has been described in terms of preferred embodiments, those skilled in the art will recognize that the invention can be practiced with modifications within the spirit and scope of the appended claims.

What is claimed is:

1. An electric discharge machining apparatus comprising:
   an tool electrode having a tip end directed toward a work piece a voltage applied between said tool electrode and said work piece generating a discharge;
   a drive shaft connected with said tool electrode;
   an electrode driving device having magnetic bearings for moving said drive shaft in three directions, including a Z-axis direction, which is an axial direction of said drive shaft, a Y-axis direction that perpendicularly crosses the Z-axis direction, and an X-axis direction that perpendicularly crosses the Y-axis direction and the Z-axis direction, by supplying electric current to electromagnetic portions of said magnetic bearings to control magnetic attraction thereof;
   a movable coupling connected with an end of said drive shaft and movable in the three directions; and
   an electric motor connected with an end of said coupling for driving said drive shaft to rotate through said coupling.

2. The electric discharge machining apparatus as set forth in claim 1, wherein said coupling comprises:
   a Z direction slider connected with said electric motor disposed above said drive shaft and movable in the Z-axis direction;
   a Y direction slider movable in the Y-axis direction;
   an X direction slider movable the X-axis direction; and
   a spring disposed between one of (i) the Z direction slider and the X direction slider and (ii) between said Z direction slider, and said Y direction slider for urging said X direction slider and said Y direction slider toward said electric motor.

3. The electric discharge machining apparatus as set forth in claim 1, wherein said coupling comprises a universal joint.

4. The electric discharge machining apparatus as set forth in claim 1, further comprising a transportation unit mounted on said electric motor for moving said electric motor in the three directions.

5. The electric discharge machining apparatus as set forth in claim 1, further comprising a rotation detection unit mounted on said electric motor for detecting rotation information of said drive shaft, wherein rotation of said drive shaft is controlled by a signal from said rotation detection unit.

6. An electric discharge machining apparatus comprising:
   a tool electrode having a tip end directed toward a work piece, a voltage applied between said tool electrode and said work piece generating a discharge;
   a drive shaft connected with said tool electrode;
   an electrode driving device having magnetic bearings for moving said drive shaft at least in a Z-axis directions among three directions, including the Z-axis direction, which is an axial direction of said drive shaft, a Y-axis direction that perpendicularly crosses the Z-axis direction, and an X-axis direction that perpendicularly crosses the Y-axis direction and the Z-axis direction, by supplying electric current to electromagnetic portions of said magnetic bearings to control magnetic attraction thereof; and
   an electric motor for driving said drive shaft to rotate through a rotation transmission mechanism connected with said drive shaft.

7. An electric discharge machining apparatus comprising:
   a tool electrode having a tip end directed toward a work piece, a voltage applied between said tool electrode and said work piece to generating a discharge;
   a drive shaft connected with said tool electrode;
   an electrode driving device having magnetic bearings for moving said drive shaft at least in a Z-axis direction, among three directions, including the Z-axis direction, which is an axial direction of said drive shaft, a Y-axis direction that perpendicularly crosses the Z-axis direction, and an X-axis direction that perpendicularly crosses the Y-axis direction and the Z-axis direction, by supplying electric current to electromagnetic portions of said magnetic bearings to control magnetic attraction thereof;
   a plurality of blades fixedly secured to said drive shaft; and
   a rotation driving conduit having a tip end directed to said blades for guiding fluid toward and proximate said blades to spray the fluid on said blades and rotate said drive shaft.

8. The electric discharge machining apparatus as set forth in claim 7, further comprising a cooling conduit mounted on said electromagnetic portions and having a tip end directed toward said electromagnetic portions for guiding the fluid to cool said electromagnetic portions.

9. The electric discharge machining apparatus as set forth in claim 8, further comprising a fluid cooling system for cooling the fluid.

* * * * *